United States Patent [19]
Holliday et al.

[11] 3,942,961
[45] Mar. 9, 1976

[54] PUMPS

[75] Inventors: Leslie Holliday, Blackburn; Roger Newton Greenwood, Burnley, both of England

[73] Assignee: Joseph Lucas (Industries) Limited, Birmingham, England

[22] Filed: Sept. 17, 1974

[21] Appl. No.: 506,902

[52] U.S. Cl. ................................. 55/203; 55/406
[51] Int. Cl.² .................................... B01D 19/00
[58] Field of Search .............. 55/203, 400–403, 55/406–409

[56] References Cited
UNITED STATES PATENTS
2,850,984  9/1958  Shiley et al. .................... 55/407

FOREIGN PATENTS OR APPLICATIONS
1,357,726  6/1974  United Kingdom ............. 55/406
716,382   10/1954  United Kingdom ............. 55/406

*Primary Examiner*—Bernard Nozick
*Attorney, Agent, or Firm*—Haseltine, Lake & Waters

[57] ABSTRACT

A vapour-separating fuel pump has a rotor which includes a pair of axially-aligned chambers having a first impeller arrangement between them. At least one of the chambers is frusto-conical and has its larger diameter adjacent the first impeller arrangement, the smaller end of this chamber forming the pump inlet. A tubular member extends axially within the other chamber and has an open end adjacent the impeller arrangement. The other end of the tubular member carries a further impeller arrangement. Liquid is discharged through a first outlet by the first impeller arrangement, and a vapour core within the tubular member is discharged through a second outlet by the further impeller arrangement.

7 Claims, 2 Drawing Figures

U.S. Patent  March 9, 1976  3,942,961

PUMPS

This invention relates to pumps and has as an object to provide a pump in a convenient form.

According to the invention a pump includes a stator, a rotor mounted within the stator and comprising a frusto-conical first chamber, an axially aligned second chamber, a first centrifugal impeller arrangement secured between the said chambers, the larger diameter end of the frusto-conical chamber being adjacent said impeller arrangement and the smaller diameter of the frusto-conical chamber defining an inlet for the pump, a hollow substantially cylindrical member having an axial through passage and mounted co-axially within the second chamber, an opening at one end of the said member being directed towards said impeller arrangement and the other end of the member being joined to the wall of the second chamber, a second impeller arrangement at the said other end of the member and adapted to discharge fluid from the said other end, and a passage within the stator communicating with the first impeller arrangement and with an outlet for the pump.

Pumps according to the invention will now be described by way of example and with reference to FIGS. 1 and 2 of the accompanying drawings.

Figure 1:
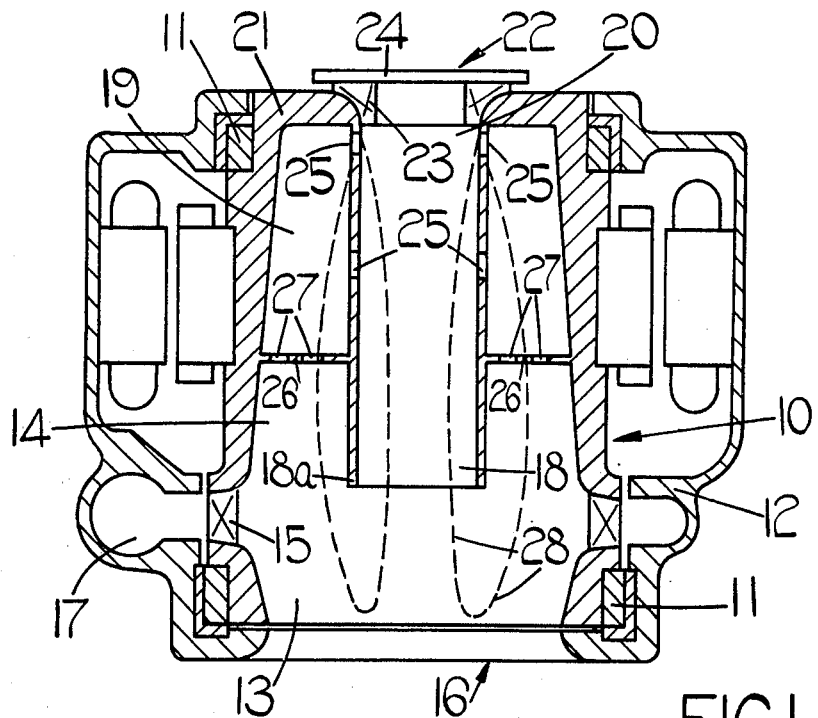

In the pump shown in FIG. 1, a rotor 10 forming part of an electric induction motor is mounted in bearings 11 in a stator 12 also forming part of the induction motor. The rotor 10 includes a pair of axially aligned frusto-conical chamber 13, 14 having a centrifugal impeller arrangement 15 mounted therebetween, the larger diameters of the chambers 13, 14 lying adjacent the impeller arrangement 15. The smaller diameter of the chamber 13 defines an inlet 16 for the pump. A volute passage 17 within the stator 12 is aligned with the impeller arrangement 15 and communicates with an outlet (not shown) for the pump.

A hollow cylindrical member 18 is mounted coaxially within the chamber 14 so as to define an annular space 19 therein the inside diameter of the member 18 being, as shown, less than the smaller diameter of the chamber 1. The member 18 has a through passage with one end adjacent the impeller arrangement 15 and its other end 20 secured to an inwardly-directed flange 21 of the rotor 10, the flange 21 being integral with the wall of the chamber 14 and at the end thereof remote from impeller arrangement 15. The end of the member 18 adjacent the impeller arrangement 15 is formed with a narrow edge 18a. Within the end 20 is mounted a centrifugal impeller arrangement 22 which comprises a plurality of vanes 23 mounted on a plate 24. The member 18 is formed with holes 25 and is additionally secured within the chamber 14 by webs 26 formed with holes 27.

The pump is particularly adapted for use with a liquid fuel and in use is mounted with the inlet 16 spaced from the bottom of a fuel tank. The stator 12 may be formed adjacent the inlet 16 with vanes which are adapted to direct fuel tangentially into the inlet 16. Rotation of rotor 10 causes fuel within the inlet 16 to be urged by centrifugal action along the walls of the chamber 13 to enter the impeller arrangement 15, whence it is discharged via the volute passage 17 to the pump outlet. Centrifugal action causes the fuel within the inlet 16 to separate into an outer liquid zone which passes to the impeller arrangement 15, a central vapour zone and an intermediate zone, defined between lines 28, as shown, in which liquid and vapour are both present. The vapour in the central zone passes through the member 18 and is ejected by the impeller arrangement 22 to re-enter the tank.

The liquid-vapour mixture in the intermediate zone passes into the pump adjacent the wall of the member 18. Continuing centrifugal action urges liquid particles towards the wall of chamber 14, the slope of this wall subsequently urging the liquid particles towards the impeller arrangement 15. The major proportion of the liquid particles within the member 18 pass through the impeller arrangement 22 to promote the necessary pumping action to induce the vapour particles within the member 18 back into the tank. A small proportion of the liquid particles within the member 18 pass through lower ones of the holes 25 into the chamber 19 and thence back to the impeller 15, whilst vapour particles in that part of the intermediate zone 28 external to the member 18 are induced through upper holes 25 into the member 18 and thence through the impeller 22 back into the tank. The amount of liquid fuel discharged by the impeller arrangement 22 is thus kept to a minimum necessary to generate the required pumping action in impeller 22. The efficiency of the pump is thereby increased, since substantially all the work of the pump is directed to discharging liquid via the passage 17 to the pump outlet.

In a modification of the pump shown in FIG. 1, holes 25, 27 are omitted, in which case there is, of course, no transference of liquid and vapour across the wall of member 18, and fluid within the pump is separated into two zones, one of which passes to the impeller arrangement 15 and the other of which is returned by the impeller arrangement 22 to the tank.

Figure 2:
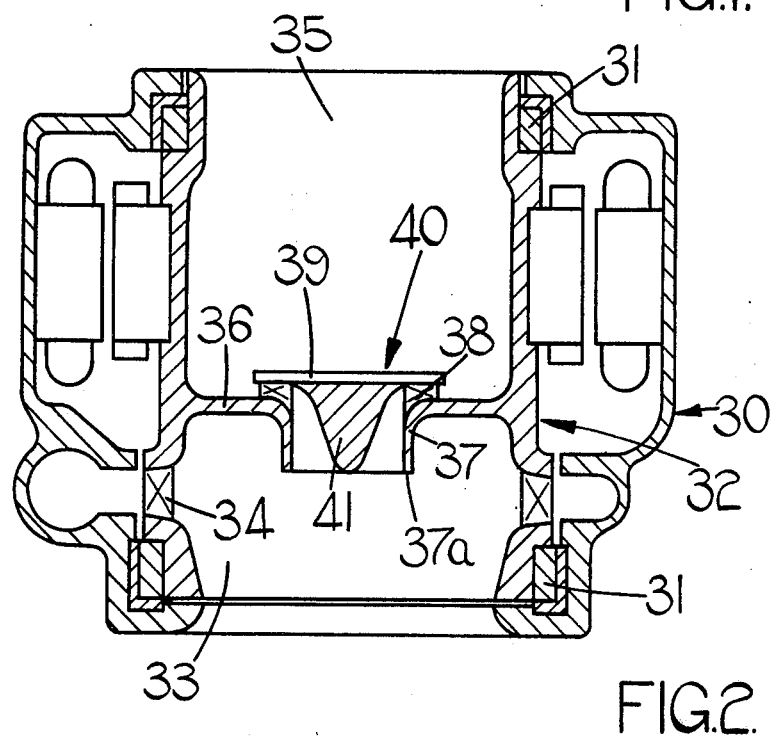

The pump shown in FIG. 2 includes a stator 30 and bearings 31 which are substantially identical with the corresponding parts of the pump of FIG. 1 and which similarly support a rotor 32. Rotor 32 has a chamber 33 and an impeller arrangement 34 which are also similar to the corresponding parts in FIG. 1. A second chamber 35 is, however, generally cylindrical and is divided, adjacent the impeller arrangement 34, by a web 36 formed integrally with an axial spigot 37, the free end of the spigot 37 being formed with a narrow edge 37a which lies close to the plane of the impeller arrangement 34. The inside diameter of spigot 37 is less than the smallest diameter of the generally cylindrical walls of chamber 35. The end of the spigot 37 remote from the edge 37a supports a plurality of blades 38 and a plate 39 which provide a further impeller arrangement 40. Within the spigot 37 is a conical flow deflector 41 whose apex is directed towards arrangement 34 adapted to direct fluid towards the impeller arrangement 40.

In use, the pump operates substantially as described with reference to the alternative form of the pump of FIG. 1. The edge 37a separates fluid in the pump into two zones, one of which is discharged via the impeller arrangement 34 and the other of which is returned to the tank via the impeller arrangement 40. It has been found that siting the impeller 40 closer to the edge 37a than in the pump of FIG. 1 allows the impeller 40 and chamber 35 to become primed at lower levels of fuel within the associated tank than is possible with the pumps described with reference to FIG. 1.

We claim:

1. A pump including a stator, a rotor mounted within the stator and comprising a frusto-conical first chamber, a second chamber axially aligned with said first chamber and lying adjacent the end thereof having the larger diameter, a first centrifugal impeller arrangement secured between said chambers, the larger end of the frusto-conical first chamber being adjacent said impeller arrangement and the smaller end of the frusto-conical first chamber defining an inlet for the pump, a hollow member having a substantially cylindrical axial through passage mounted co-axially within the second chamber, the diameter of said through passage being less than the smallest diameter of said second chamber, an opening at one end of said member being at the level of said impeller arrangement, the other end of said member being joined to a wall of the second chamber, a second impeller arrangement mounted at the end of said through passage remote from said first impeller for discharging fluid from said through passage, said stator having a passage therein communicating with the first impeller arrangement and with an outlet for the pump and a radial web securing said hollow member to said second chamber, said hollow member and said web being provided with a plurality of holes.

2. A pump as claimed in claim 1 in which said other end of the member is secured to the wall of the second chamber at an end of said second chamber remote from the first impeller arrangement.

3. A pump as claimed in claim 1 in which the second chamber is frusto-conical.

4. A pump as claimed in claim 3 in which the larger diameter end of the second chamber is adjacent said first impeller arrangement.

5. A pump including a stator, a rotor mounted within the stator and comprising a frusto-conical first chamber, a second chamber axially aligned with said first chamber and lying adjacent the end thereof having the larger diameter, a first centrifugal impeller arrangement secured between said chambers, the larger end of the frusto-conical first chamber being adjacent said impeller arrangement and the smaller end of the frusto-conical first chamber defining an inlet for the pump, a hollow member having a substantially cylindrical axial through passage mounted co-axially within the second chamber, the diameter of said through passage being less than the smallest diameter of said second chamber, an opening at one end of said member being at the level of said impeller arrangement, a radial web securing the other end of said member to a wall of the second chamber, a second impeller arrangement mounted at the other end of said through passage remote from said first impeller for discharging fluid from said through passage, said stator having a passage therein communicating with the first impeller arrangement and with an outlet for the pump, said radial web and said other end of the through passage lying within the second chamber, and a conical element mounted within said hollow member for directing fluid to said second impeller arrangement, said second impeller arrangement being disposed between said web and said conical element.

6. A pump as claimed in claim 1 in which the second chamber is substantially cylindrical.

7. A pump as claimed in claim 6 in which said hollow member is integral with said radial web and said wall of the second chamber.

* * * * *